United States Patent
Doyle (10) Patent No.: US 9,674,906 B2
(45) Date of Patent: Jun. 6, 2017

(54) CONTROL CIRCUIT FOR CONTROLLING CURRENT THROUGH A LOAD USING A PHASE-CUT THYRISTOR ARRANGEMENT AND METHOD FOR CONTROLLING THEREOF

(71) Applicant: Lily Digital LLP, Horsham, West Sussex (GB)

(72) Inventor: Anthony Doyle, Horsham (GB)

(73) Assignee: Lily Digital LLP, Horsham (GB)

( * ) Notice: Subject to any disclaimer, the term of this patent is extended or adjusted under 35 U.S.C. 154(b) by 0 days.

(21) Appl. No.: 15/006,514

(22) Filed: Jan. 26, 2016

(65) Prior Publication Data

US 2016/0219661 A1 Jul. 28, 2016

(30) Foreign Application Priority Data

Jan. 26, 2015 (GB) .................................. 1501260.2

(51) Int. Cl.
  *H05B 37/02* (2006.01)
  *H05B 33/08* (2006.01)
  *H02M 7/155* (2006.01)

(52) U.S. Cl.
  CPC ...... *H05B 33/0815* (2013.01); *H02M 7/1557* (2013.01); *H05B 33/0845* (2013.01); *Y02B 20/347* (2013.01)

(58) Field of Classification Search
  CPC . H05B 33/0815; H05B 37/02; H05B 41/3924
  (Continued)

(56) References Cited

U.S. PATENT DOCUMENTS 4,331,914 A * 5/1982 Huber ................. H02M 5/2576
  315/199
7,687,940 B2 * 3/2010 Mosebrook ........ H05B 37/0209
  307/115
(Continued)

FOREIGN PATENT DOCUMENTS

JP  2006032031     2/2006
JP  2006032031 A   2/2006
(Continued)

OTHER PUBLICATIONS

GB Intellectual Property Office; Search Report for GB1501260.02; Jul. 5, 2015; 2 pages.
(Continued)

*Primary Examiner* — Thuy Vinh Tran
(74) *Attorney, Agent, or Firm* — Schwabe, Williamson & Wyatt P.C.

(57) ABSTRACT

A dimmer switch for an LED light source utilizes a thyristor-type device ("TTD") having a first terminal, a second terminal, and a gate terminal. A low-voltage power supply converts alternating voltage into a direct voltage and is connected in parallel with the TTD. Gate current supplying circuitry is provided to supply current to the gate of the TTD, the gate current supplying circuitry powered by the low-voltage power supply and including a variable input device operable to vary a voltage waveform at the gate of the TTD in order to vary a voltage waveform provided at the second terminal. A method for controlling current through the load comprises controlling conductivity of the TTD by varying the voltage waveform at the gate of the TTD including, within a half-cycle of an alternating voltage being applied to the first terminal, applying a first voltage waveform at the gate, so as to place the TTD in a conducting state, followed
(Continued)

by applying a second voltage waveform to maintain the TTD in the conducting state.

19 Claims, 7 Drawing Sheets

(58) Field of Classification Search
USPC .................................................. 315/194, 291
See application file for complete search history.

(56) References Cited

U.S. PATENT DOCUMENTS

| 8,497,637 | B2 | 7/2013 | Liu | |
|---|---|---|---|---|
| 9,250,669 | B2* | 2/2016 | Blakeley | G06F 1/26 |
| 2006/0255959 | A1 | 11/2006 | Salvestrini | |
| 2012/0033471 | A1 | 2/2012 | Newman | |
| 2012/0223651 | A1 | 9/2012 | Murakami | |
| 2012/0230073 | A1 | 9/2012 | Newman | |
| 2012/0242238 | A1 | 9/2012 | Chen | |
| 2013/0170263 | A1 | 7/2013 | Newman | |
| 2014/0111119 | A1 | 4/2014 | Ostrovsky | |
| 2016/0124453 | A1* | 5/2016 | Blakeley | G06F 1/26 |
| | | | | 700/291 |

FOREIGN PATENT DOCUMENTS

| JP | 2008053181 | 3/2008 |
|---|---|---|
| JP | 2014112528 | 6/2014 |

OTHER PUBLICATIONS

European Patent Office; Munich Germany; Extended Search Report EP application 16152647.0; Jun. 16, 2016, 10 Pages.
EPO; JP 20060032031 published Feb. 2, 2006; EPO English translation reference D1 of EPO Extended Search Report; 10 pages.

* cited by examiner

CONTROL CIRCUIT FOR CONTROLLING CURRENT THROUGH A LOAD USING A PHASE-CUT THYRISTOR ARRANGEMENT AND METHOD FOR CONTROLLING THEREOF

RELATED APPLICATIONS

This application claims foreign priority to GB 1501260.2, with a filing date of Jan. 26, 2015, incorporated herein in its entirety by this reference.

BACKGROUND OF THE INVENTION

The invention relates to a control circuit and method for controlling the power supplied to an electric device. The invention has particular relevance to a dimmer switch for an LED light source.

In recent years, LED light sources have been replacing incandescent bulbs, fluorescent bulbs and other light sources in a variety of lighting applications due to their efficiency, small size and high reliability. However, using a dimmer switch designed for use with one of those conventional light sources with an LED light source may result in sub-optimum performance.

Figure 1:
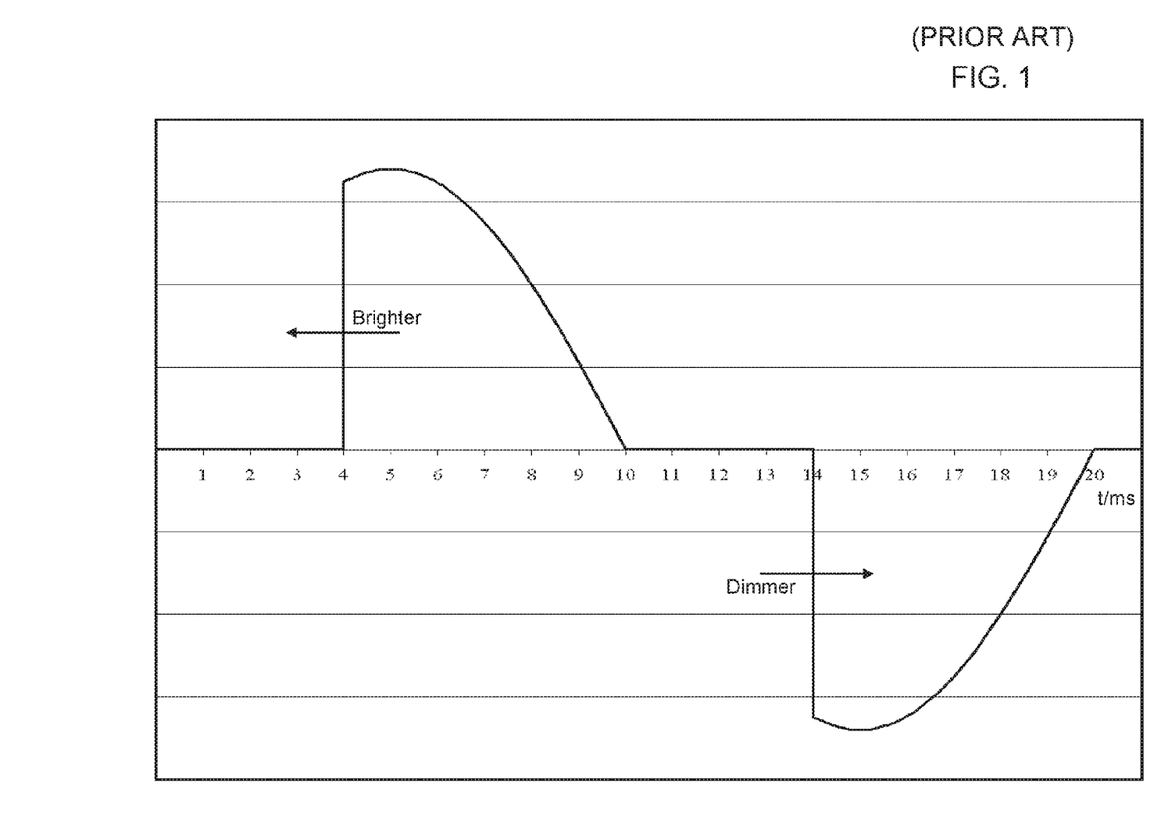
FIG. 1 is a graph of an output voltage of a typical phase-cut thyristor arrangement.

A dimmer switch for an incandescent light source typically uses a phase-cut thyristor arrangement to control the duration of the part of each AC mains half-cycle that is supplied to the incandescent light source. In particular, a user can adjust the point in time in the AC mains half-cycle when the thyristor switches on; the earlier the thyristor is switched on, the brighter the incandescent light source. FIG. 1 shows the output voltage waveform of an example of a typical phase-cut thyristor arrangement for a single cycle of a 50 Hz AC mains input voltage. In this example, during the first 4 ms of each AC half-cycle no current is applied to a thyristor gate so that no power is output to the light source during this time. By adjusting the time when current is first applied to the thyristor gate, the RMS output voltage/current is increased or decreased such that the brightness of the incandescent light source is also increased or decreased. The thyristor switches on when a gate current exceeds a threshold value, but will then remain conducting until the load current through the thyristor drops below a threshold value for sufficient time for the thyristor to return to a blocking state, regardless of the level of the gate current, which typically drops to a very low value after the thyristor starts conducting, to conserve power.

Conventional thyristor-based dimmer switches work well with predominantly resistive loads, such as incandescent light sources, because following the thyristor switching on in an AC mains half-cycle, the load current only drops low enough for the thyristor to switch off at the end of the AC mains half-cycle. However, thyristor-based dimmer switches do not work satisfactorily with loads having a large capacitive component, such as drive circuits for some LED light sources, because following the thyristor switching on, a large initial load current is followed by a low load current that causes the thyristor to switch off. Given the rapid response time of LEDs, the switching off of the thyristor can result in the LED light source temporarily switching off before a gate current is applied during the next AC mains half-cycle, to cause the thyristor to conduct again. This switching on and off may be perceived as an undesirable flickering of the LED light source.

There is an analogous problem in controlling electric motors using a phase-cut thyristor arrangement. Instead of LEDs visibly turning on and off, an electric motor may slow down or stop its rotation during the period between mains half-cycles when the thyristor is switched off. Accordingly, the motor may rotate in an unstable, faltering manner, which is obviously undesirable in applications when a steady rotation is required.

Various approaches have been suggested in the past for addressing this problem. For example, U.S. Pat. No. 8,497,637 B2 describes an LED driver circuit, which receives a voltage signal output from a phase-cut triac dimmer. A triac is a particular thyristor-type device allowing bidirectional current flow, which can be triggered by a positive or negative gate current. In U.S. Pat. No. 8,497,637 B2, the output of the triac dimmer is pulse width modulated in the LED driver so that an LED light source is turned on and off at a frequency higher than the threshold of human perception. These LED drivers may be designed to work with standard triac dimmer-switches. However, such an LED driver is not always desirable as additional circuitry is required in a driver circuit at the LED light source. Typically, LED drivers are arranged in close proximity to the LED light source to avoid power losses associated with their high output current. In many cases they are integral within the LED lamp. There is therefore a desire to provide a dimmer-switch, which allows any LED lamp to be fitted rather than LED lamps with special drivers for use with standard dimmer-switches. For multiple lamp loads, the use of such a dimmer-switch incorporating the present invention would replace the need for multiple special drivers.

SUMMARY OF THE INVENTION

The present invention provides an alternative approach to variable power control using a phase-cut thyristor-type arrangement, in the form of a control circuit. According to the present invention, voltage regulation means, electrically connected in parallel with a thyristor-type device, supplies power to a gate current supplying means. The gate current supply circuit includes a variable input device operable to vary a voltage waveform at the gate of the thyristor-type device in order to vary the voltage waveform provided at the second terminal. The gate current supply circuit is operable to supply a first voltage waveform to the gate of the thyristor-type device to switch the thyristor-type device into a conducting state, followed by a second voltage waveform to maintain the thyristor-type device in the conducting state. A thyristor-type device is any of a family of semiconductor devices for which conduction between two load terminals is triggered by applying a current to a gate terminal. While sufficient load current continues to flow, the thyristor-type device will continue to conduct without applying current to the gate terminal The control circuit of the invention is for a load, which is preferably a fast-acting or capacitive load. For example, the load may be an LED light source. The control circuit may be, for example, a dimmer switch for the load.

In some embodiments, the second voltage waveform, has an average magnitude that is less than or equal to that of the first voltage waveform. This may be important when the thyristor-type device is switched to the conducting state early in an AC main half-cycle, because the voltage regulation means only receives power when the thyristor-type device is in a non-conducting state and therefore the amount of energy available for the second voltage waveform is limited. Nevertheless, it has been found that a second voltage waveform with a reduced average magnitude can maintain the thyristor-type device in a conducting state while the reduced energy requirement associated with the reduced average magnitude means that the voltage regulation means is able to supply sufficient energy even when the thyristor-type device is switched to the conducting state early in the AC mains half-cycle.

Preferably, the first and second voltage waveforms are different, for example, by having different shapes and/or by being spaced apart, or distinct. The second voltage waveform may be continuous with the first voltage waveform, but have a different shape, or voltage profile/level. Alternatively, the gate current supplying means may be arranged to supply no current to the gate for a period of time between the first voltage waveform and the second voltage waveform. In that case, the first and second voltage waveforms may have the same shape/profile, such as identical pulses, but spaced apart, or different profiles spaced apart. Such embodiments can, and are preferably designed to, reduce the energy required from the voltage regulation means. In some cases, at a high brightness level as specified by the variable input device, the gate current supplying means is arranged to supply no current to the gate for a period of time between the first voltage waveform and the second voltage waveform, while at a low brightness level, the second voltage waveform is continuous with the first voltage waveform.

In some embodiments, the second voltage waveform is a constant voltage waveform. The absolute magnitude of such a second waveform may be different from that of the first voltage waveform. In other embodiments, the second voltage waveform is a series of pulses. In which case, the absolute magnitude of the pulses may be different from that of the first voltage waveform. In some embodiments, the second voltage waveform has a different average magnitude to that of the first voltage waveform. Any of the above embodiments in which the second voltage waveform has a different magnitude to the first voltage waveform may further specify that the magnitude of the second voltage waveform is less than that of the first voltage waveform.

In some embodiments, the gate current supplying means comprises a microcontroller powered by the voltage regulation means. A microcontroller advantageously is able to control the supply of a gate current while taking up little physical space. In some embodiments, the thyristor-type device is a triac, which has the advantage of allowing bidirectional current flow.

Preferably, the power consumed by the second waveform is less than that consumed by the first waveform, thereby achieving the goal of the invention without significant increase in energy consumption over the arrangements of the prior art.

In some embodiments, the gate current supplying means is also arranged to supply, within a second half-cycle of an alternating voltage applied to the first terminal, a third voltage waveform at the gate of the thyristor-type device to supply a gate current to place the thyristor-type device in a conducting state followed by a fourth voltage waveform to supply a gate current to maintain the thyristor-type device in a conducting state. In such embodiments, the first and third voltage waveforms and the second and fourth voltage are either the same or different.

In some embodiments, the control circuit for the invention is provided with an additional connection to the alternating voltage source for supplying power to the low-voltage power supply of the control circuit even when the thyristor-type device is conducting.

In a further embodiment, a system is provided comprising a control circuit in accordance with the present invention in which the load is fast-reacting or capacitive. The load may be an LED light source and the control circuit may be a dimmer switch circuit.

According to the present invention, a method for controlling current through a load is also provided. An alternating voltage is applied to a first terminal of a thyristor-type device and the conductivity of the thyristor-type device is controlled by supplying current to a gate of the thyristor-type device. Within a half-cycle of the alternating voltage being applied to the first terminal, a first voltage waveform is applied at the gate of the thyristor-type device to place the thyristor-type device in a conducting state followed by a second voltage waveform to maintain the thyristor-type device in a conducting state. An output from a second terminal of the thyristor-type device is supplied to the load. Other preferred features of the method of the invention correspond to preferred features of the control circuit.

BRIEF DESCRIPTION OF THE DRAWINGS

By way of example, an embodiment of the present invention will now be described in detail with reference to the accompanying drawings, in which.

DETAILED DESCRIPTION OF THE INVENTION

A first embodiment of the invention will now be described with reference to FIGS. 2 to 5.

Figure 2:
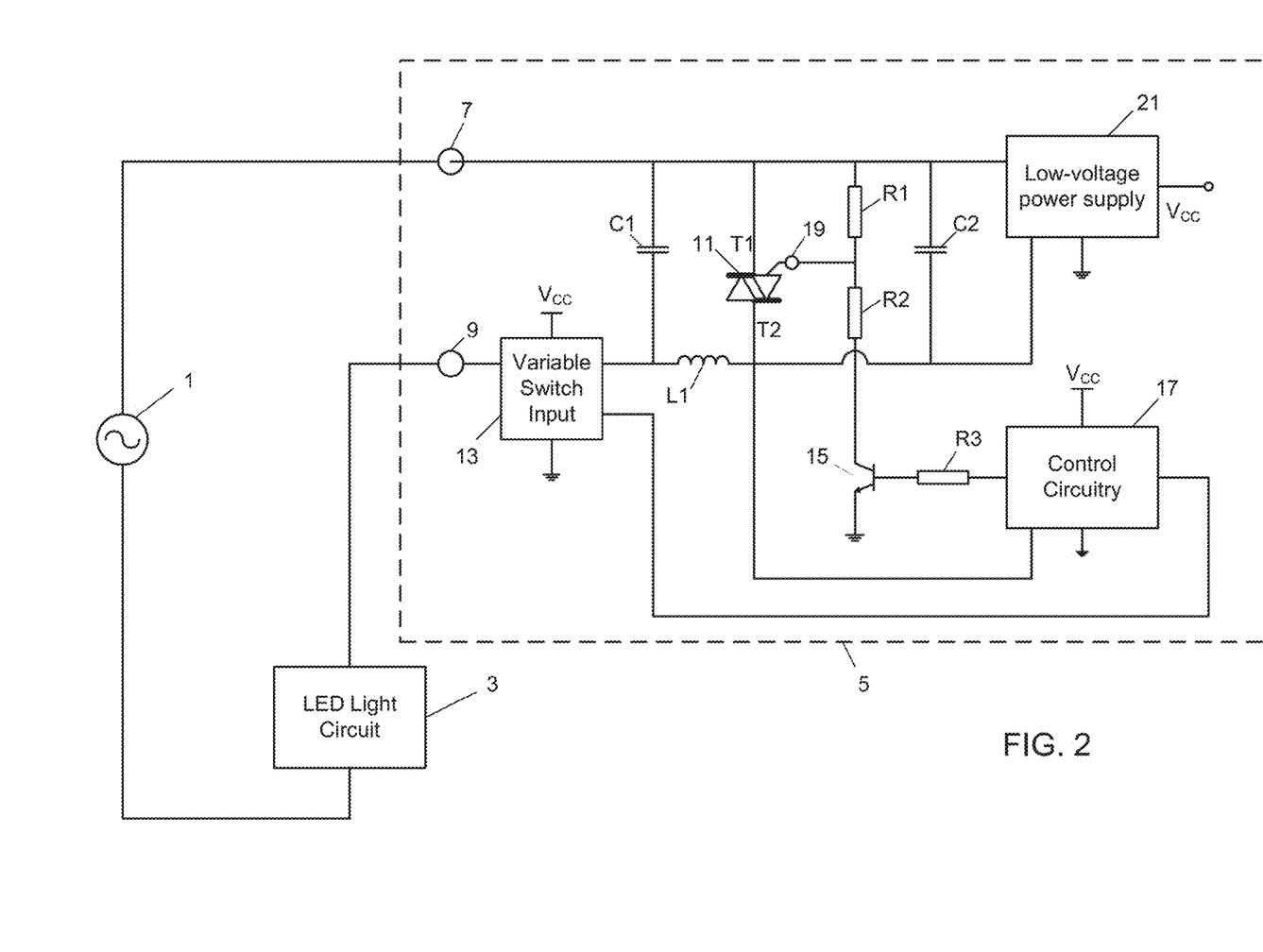
FIG. 2 is a block diagram of an LED lighting circuit including a dimmer switch circuit in accordance with an embodiment of the present invention.

FIG. 2 provides an overview of the circuit elements in an arrangement according to the embodiment.

An AC mains power supply 1 is connected between an LED light circuit 3 and dimmer switch circuit 5. In a typical household/office lighting scenario, LED light circuit 3 may include a large number of LEDs that are controlled by at least one dimmer switch circuit 5. Dimmer switch circuit 5 is connected to AC mains power supply 1 and LED light circuit 3 through input terminal 7 and output terminal 9 respectively.

Dimmer switch circuit 5 is most easily understood by considering functional circuit components separately. Like a conventional dimmer switch circuit for an incandescent bulb, dimmer switch circuit 5 provides a phase-cut thyristor-type arrangement, using triac 11 as the thyristor-type device.

In accordance with a user input at variable switch input 13, gate current supply circuitry including resistors R1-R3, transistor 15 and control circuit 17 is configured to provide a current signal at gate terminal 19. Control circuitry 17 is preferably implemented using a microcontroller such as a suitably configured PIC12F1840 microcontroller from Microchip Technologies Inc. Control circuitry 17 may also take an output of triac 11 as an input to determine timing information for the current signal provided to the gate terminal 19. Typical values for the resistance of resistors R1-R3 are 22 kΩ, 1 kΩ and 47 kΩ respectively.

In contrast to prior art LED dimmer circuits, the particular signal received at gate terminal 19 advantageously allows triac 11 to remain conductive for the duration of the mains half-cycle after it is switched on. The signal received at gate terminal 19 will be explained in greater detail below in relation to FIG. 3. A signal supplying current to the gate terminal 19 requires a stable DC voltage power supply for control circuitry 17: the more current that the signal supplies to gate terminal 19, the more power is required by control circuitry 17. As discussed in the following, the power available for such a signal may be limited by design constraints.

For example, in the first embodiment, a DC voltage of $V_{CC}$ is provided by low-power voltage supply 21 with a typical value of 5V above ground potential. However, as low-power voltage supply 21 is arranged in parallel with triac 11, it can only draw power to provide $V_{CC}$ when triac 11 is not itself drawing power from the mains. Moreover, space is at a premium within a typical dimmer switch housing so it may not be possible to include large components (e.g. capacitors) capable of storing large amounts of energy. Given the finite power and space available for low-power voltage supply 21, aspects of the design of low-power voltage supply 21 require careful consideration. Low-power voltage supply 21, which takes the AC mains voltage as an input and outputs voltage $V_{CC}$, includes a voltage regulator. In one example, the voltage regulator is an MCP1702 low-dropout regulator from Microchip Technologies Inc. As explained above, low-power voltage supply 21 may only draw power when triac 11 is in a non-conducting state. In some scenarios, due to limitations of the circuit, voltage supply 21 must store sufficient energy for a full mains cycle from only the period during the first mains half-cycle when triac 11 is non-conducting. Capacitor C2, arranged in parallel across the triac terminals, provides such energy storage so that voltage regulator can function as required. There is however a trade off in the choice of capacitor C2. The capacitance of C2 should be large so that enough energy can be stored for a full mains cycle. However, a large capacitance has three main drawbacks:

1) A large capacitance requires a physically large capacitor for which there may be insufficient space in a dimmer switch housing;

2) A current will be drawn from the mains supply, which may place certain components in the power supply under additional stress; and 3) The current drawn to the power supply will cause unwanted brightness and perceptible flickering when the dimmer is turned low.

Figure 3:
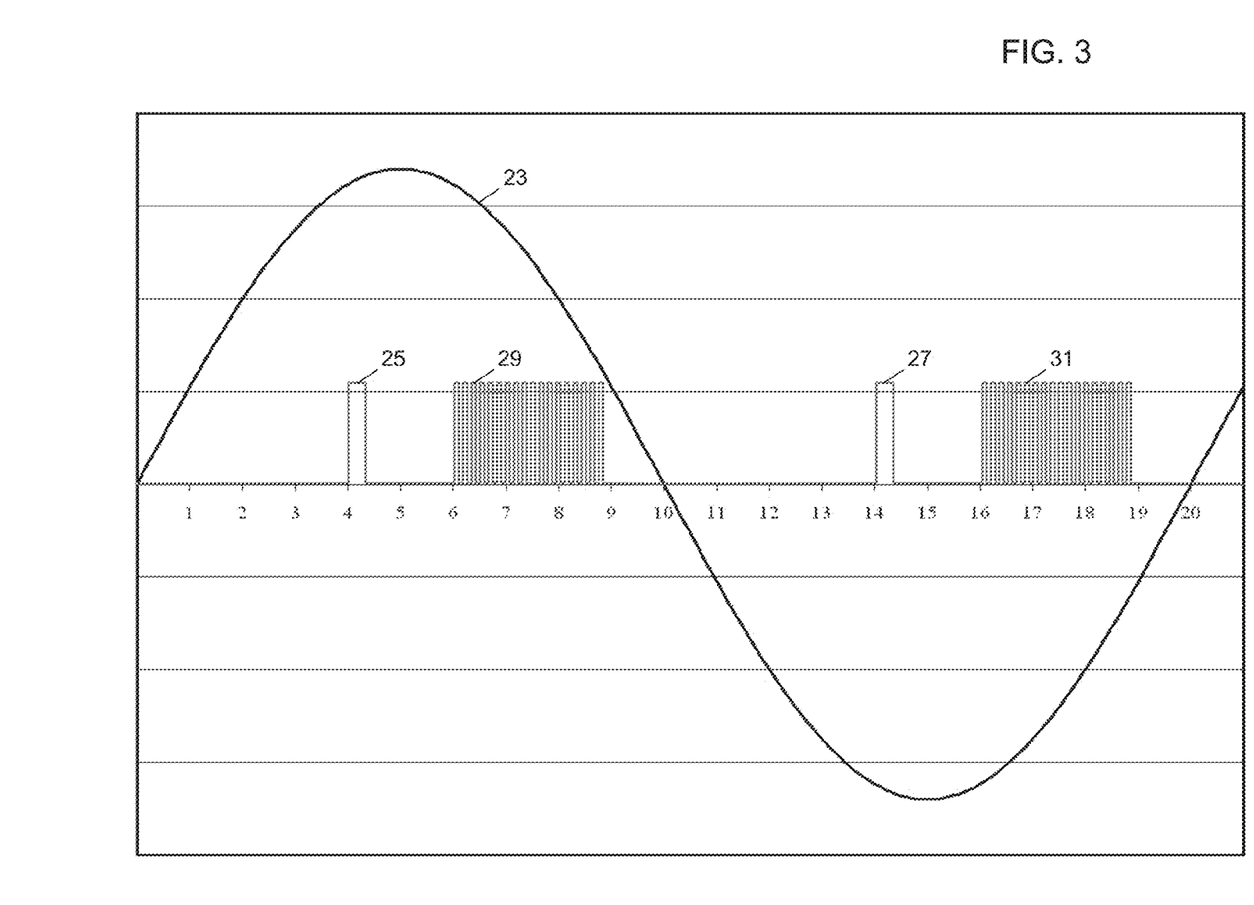
FIG. 3 shows a graph comparing an AC mains cycle to a thyristor gate voltage signal in a circuit as shown in FIG. 2.

In the present embodiment, it has been found that a 220 nF capacitor with a 15 mm pitch satisfies the energy requirements without the drawbacks described above when using the particular PWM waveforms of FIG. 3.

The problem of providing sufficient power at gate terminal 19 is exacerbated because further components requiring power from low-power supply voltage 21 may also be included in dimmer switch circuit 5. For example, as shown in FIG. 2, variable switch input 13 uses voltage $V_{CC}$ from low-voltage power supply 21. Furthermore, it is well known that a thyristor-type device's conduction properties vary with temperature. Thus, control circuitry 17 may also receive an input from a temperature sensor, which also uses voltage $V_{CC}$, to control the level of current at gate terminal 19 accordingly.

The remaining circuit elements shown in FIG. 2, i.e. capacitor C1 and inductor L1, are used for RF suppression back to the AC mains voltage supply 1.

FIG. 3 shows the timing of a gate terminal current/voltage signal at gate terminal 19 in relation to that of an AC mains cycle 23. As indicated above, triac 11 of FIG. 2 will switch on when sufficient current is applied at gate terminal 19. Such a current is provided by initial voltage pulse waveform 25, comprising a single pulse. In FIG. 3, pulse waveform 25 occurs 4 ms after the start of the AC mains cycle 23 in accordance with the typical output voltage waveform of FIG. 1. However, the timing of the pulse waveform 25 may of course be adjusted to implement the dimming functionality. Pulse waveform 25 must be long enough for triac 11 to switch on. Typically, this means a pulse length of at least 150 μs and, in the present embodiment, a pulse length of 500 μs is used.

Immediately following pulse waveform 25, the current flowing through triac 11 is large enough that triac 11 will continue to be conductive without current applied to the gate terminal 19. However, in the example of FIG. 3, at about 6 ms from the start of the AC mains cycle 23, the triac current drops below the level required for continued conduction. Without any further intervention, the current flowing in triac 11 would therefore drop to zero for up to 8 ms (from 6 ms from the start of AC mains cycle 23 to 14 ms from the start of AC mains cycle 23, when pulse waveform 27 causes triac 11 to conduct in the second mains half-cycle, similarly to pulse waveform 25). In practice, this results in a perceptible flicker of the LED light source. Advantageously, pulse width modulated (PWM) waveform 29 is applied to gate terminal 19 to allow triac 11 to remain conductive for the duration of the first AC mains half cycle after triac 11 is switched on. A corresponding PWM waveform 31 is also applied in the second mains half-cycle. Accordingly, the period between the current output dropping to zero at the end of one mains half-cycle and triac 11 being switched on in the subsequent mains half-cycle is reduced. This reduction is such that the LED light source turning on and off is imperceptible to the human eye.

Waveforms 25 and 29 (and similarly, waveforms 27 and 31) are designed to offer the best possible efficiency in the use of energy from the low-voltage power supply. For example, the gap between waveforms 25 and 29 implies that no current, and hence power, is being used in supplying a signal to gate terminal 19 for that period. Similarly, the use of PWM for PWM waveform 29 advantageously reduces the average current supplied to gate terminal 19 for the duration of waveform 29. For the present embodiment, a PWM waveform 29 with 25 μs pulses separated by 75 μs spaces has been shown to maintain triac 11 in a conducting state. Additionally, the values of the voltage pulses with respect to ground in waveforms 25 and 29 are chosen to just exceed a level required to allow triac 11 to conduct.

Figure 4:
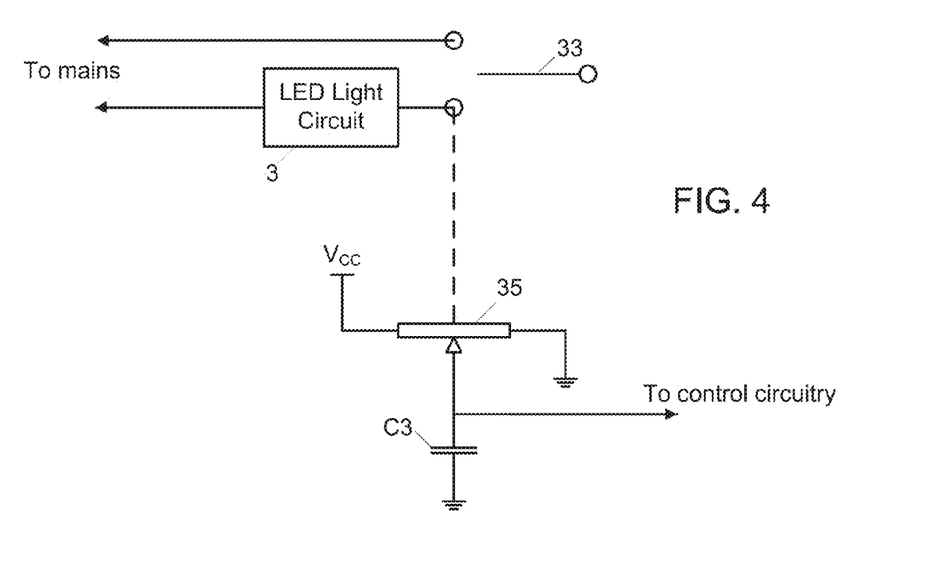
FIG. 4 is a circuit diagram of the variable switch input in the dimmer switch circuit of FIG. 2.

FIG. 4 shows a schematic view of variable switch input 13. Single pole double throw (SPDT) switch 33 allows two-way switching found typically in domestic lighting. In this configuration, the degree to which current passes through the light source is controlled by potentiometer 35. The two end terminals of potentiometer 35 are connected to ground and $V_{CC}$ (from low-voltage power supply 21) respectively. The sliding contact of potentiometer 35 is adjusted by a user input to provide a voltage level to control circuitry 17. Depending on the voltage level received from potentiometer 35, control circuitry 17 will adjust the timing of pulse waveforms 25 and 27, as described in relation to FIG. 3.

MODIFICATIONS AND FURTHER EMBODIMENTS

Figure 5:
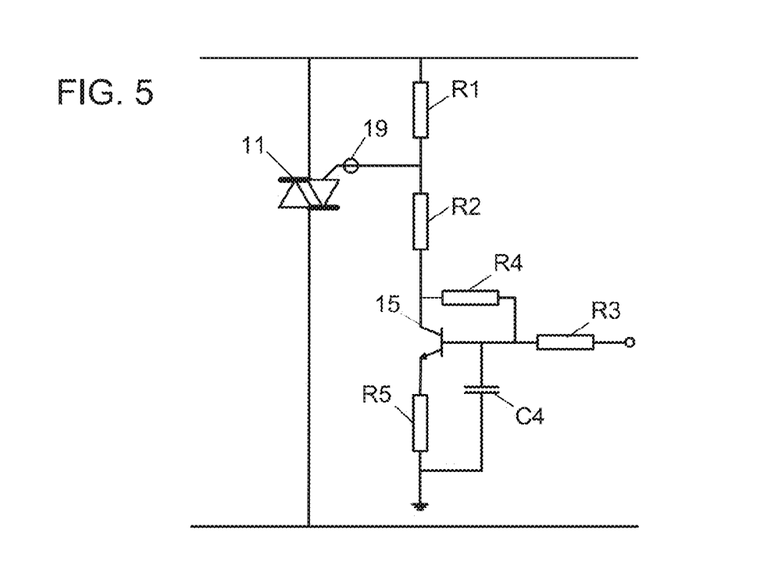
FIG. 5 is a circuit diagram of an alternative arrangement for supplying a gate current to the triac in FIG. 2.
Figure 6A:
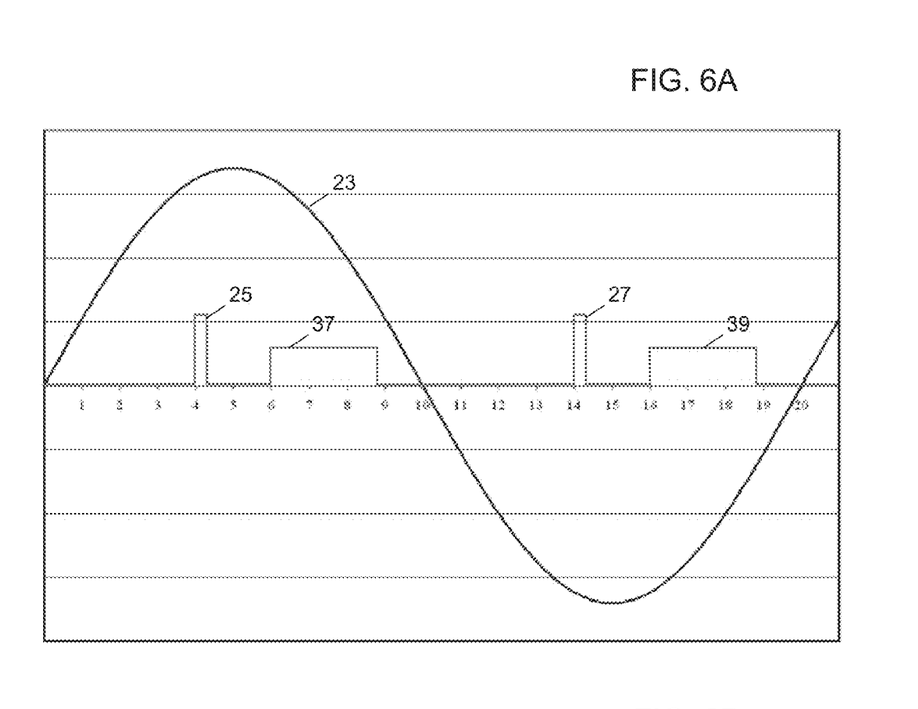
FIG. 6A is a graph comparing an AC mains cycle to a thyristor-type device gate voltage signal in a circuit as shown in FIG. 5.

In the first embodiment, control circuitry 17 is adapted to provide initial pulse waveforms 25 and 27 and PWM waveforms 29 and 31 to gate terminal 19. Other voltage signals may be applied to gate terminal 19. For example, FIG. 5 shows a similar triac arrangement as in FIG. 2, with additional resistor R4 connected between the collector and base of transistor 15, resistor R5 connected between ground and the emitter of transistor 15 and capacitor C4 connected between ground and the base of transistor 15. These components act in combination to convert the PWM output of control circuitry 17 into a substantially constant low-level voltage. Such a gate terminal voltage characteristic is shown in FIG. 6A. Instead of PWM waveforms 29 and 31 in FIG. 3, FIG. 6A shows single pulse waveforms 37 and 39 each with a lower voltage magnitude than the initial pulse waveforms 25 and 27. This lower voltage magnitude also means that relatively little power is required.

Figure 6B:
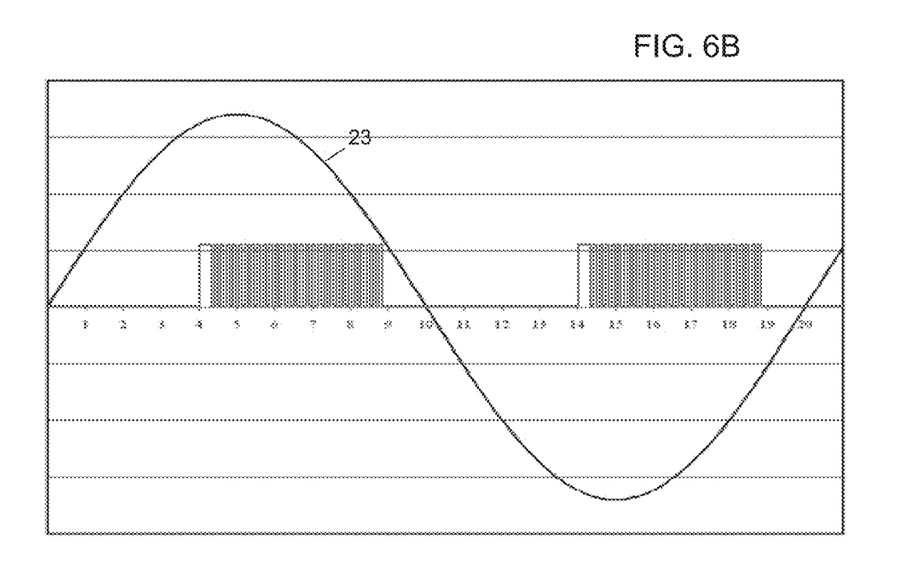
FIG. 6B is a graph comparing an AC mains cycle to a thyristor-type device gate voltage signal in a circuit as shown in FIG. 2.
Figure 6C:
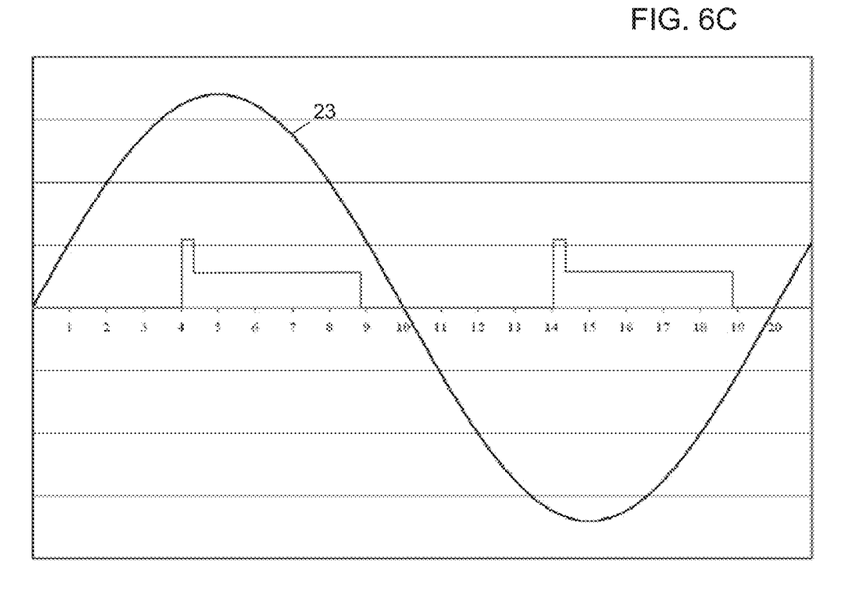
FIG. 6C is a graph comparing an AC mains cycle to a thyristor-type device gate voltage signal in a circuit as shown in FIG. 5.

Although FIG. 3 shows a gap between the initial pulse waveform 25 and the PWM waveform 29 (and FIG. 6A shows a gap before single pulse waveform 37), which reduces the power requirements of the control circuitry 17, in some embodiments, no gap is required and employed when the dimmer is turned lower and the power supply has adequate energy to accommodate this. Accordingly, the length of gap between the initial pulse waveform and the second waveform 29 may be reduced as the dimmer turns lower, with no gap at all at a sufficiently low dimmer level. In other embodiments, it may be simpler to omit the gap entirely at all brightness settings. Examples of such embodiments are shown in FIGS. 6B and 6C, which respectively provide PWM and constant voltage waveforms continuous with initial pulse waveform 25.

Figure 6D:
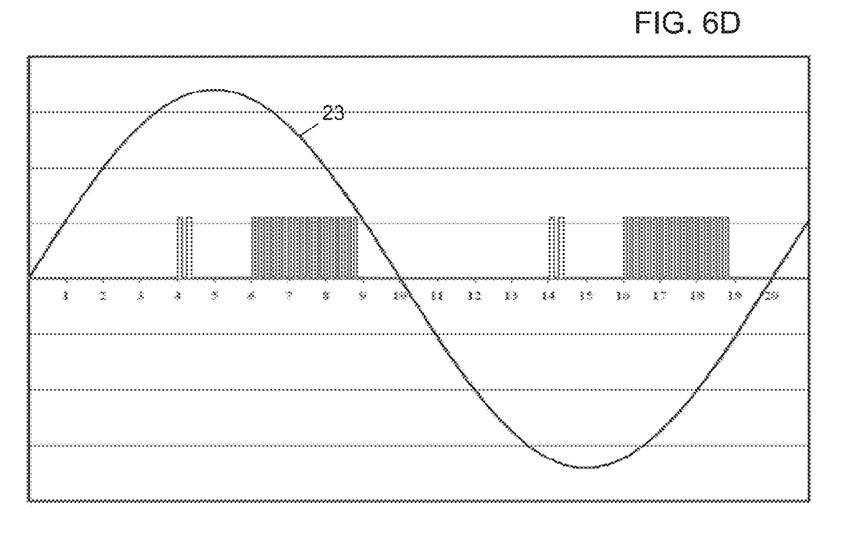
FIG. 6D is a graph comparing an AC mains cycle to a thyristor-type device gate voltage signal in a circuit as shown in FIG. 2.
Figure 6E:
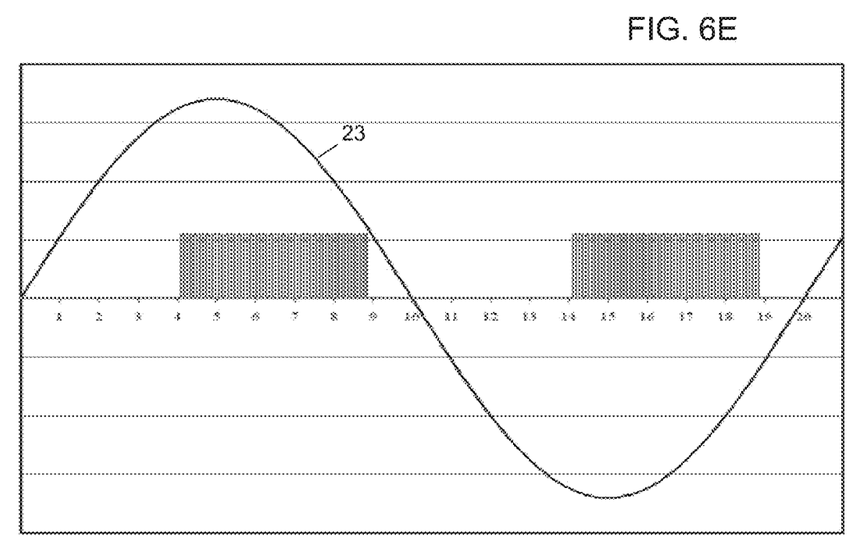
FIG. 6E is a graph comparing an AC mains cycle to a thyristor-type device gate voltage signal in a circuit as shown in FIG. 2.

Other embodiments may provide that the voltage of the pulses in the second PWM and constant voltage waveforms (whether continuous with the initial waveform or not) have absolute value voltage levels above ground level, the same as or lower than that of the initial waveform. In other embodiments, the initial pulse waveforms 25 and 27 may be replaced with PWM waveforms. Examples of such embodiments, with and without gaps between the initial, triggering waveform and subsequent maintaining waveform, are shown in FIGS. 6D and 6E respectively. It will be appreciated that the duty cycle (i.e. the length of pulse duration and/or space duration) of the triggering and maintaining PWM waveforms may be different.

Although FIGS. 3 and 6A-6E show that the same waveforms may be provided for both the first and second AC half-cycles, this need not be the case. Particularly in embodiments where power can only be received by the low-voltage power supply 21 in the first AC half-cycle, the waveforms sent in the second AC half-cycle may be different to those sent in the first AC half-cycle. Any combination of single pulse waveforms and PWM waveforms as provided above for the first AC half-cycle may be provided for each of the first and second AC half-cycles.

In further embodiments, different electrical components may be used. For example, instead of using a microcontroller to implement control circuitry 17, an application specific integrated circuit (ASIC) may be used. Additionally, variable switch input 13 of the first embodiment may be replaced by other input systems adapted to control the light output from the LED light source in response to one or more of:

1) Presence or absence of a person in the area to be illuminated (e.g. through a motion detector).

2) A light level in the area to be illuminated. A detector for such a light level may be incorporated in the control device according to the present invention.

3) A radio control signal or a signal from an infra-red remote control.

4) An output from a 1-10V controller from intelligent building management or from a local user control.

Furthermore, instead of a physical switch, variable switch input 13 may be replaced by one or more tactile or touch or other user control interfaces.

In a further embodiment a connection, additional to 7 and 9 in FIG. 2, may be added; namely a connection to dimmer switch circuit 5 from the AC mains power supply 1 on the side where it also connects to LED light circuit 3. This will enable power to be supplied to the low-voltage power supply 21 even during the periods when the triac 11 is conducting. This would enable waveform such as that in FIG. 6C to be achieved with a lower value of C2. This will further ameliorate the three disadvantages of a large C2 described above.

The above embodiments relate to a dimmer switch circuit capable of reducing flicker in an LED light source. However, the invention is also applicable to light sources other than LEDs. For example, compact fluorescent lamps (CFLs) may display similar current characteristics and may therefore have the same requirement to sustain the conducting state. Furthermore, electric motors, in a fan for example, may also have similar current characteristics to those of LEDs and so may also benefit from a similar control circuit. In general, the invention is applicable for providing current and/or voltage control for any fast-reacting or capacitive load. It is also capable of controlling a resistive load such as incandescent lamps.

The invention claimed is:

1. A control circuit for controlling current through a load, the control circuit comprising:
    a first terminal for connection to an alternating voltage source;
    a second terminal for connection to the load;
    a thyristor-type device connected between the first and second terminals and having a gate terminal;
    a low-voltage power supply for converting alternating voltage into a direct voltage, wherein the low-voltage power supply is connected between the first and second terminals in parallel with the thyristor-type device; and
    gate current supplying means operable to supply current to the gate terminal of the thyristor-type device, the gate current supplying means being powered by the low-voltage power supply and including a variable input device operable to vary a voltage waveform at the gate terminal of the thyristor-type device in order to vary a voltage waveform provided at the second terminal, wherein the gate current supplying means is arranged to supply, within a first half-cycle of an alternating voltage applied to the first terminal, a first voltage waveform at the gate terminal of the thyristor-type device to supply a gate current to place the thyristor-type device in a conducting state followed by a second voltage waveform to supply a gate current to maintain the thyristor-type device in a conducting state.

2. A control circuit according to claim 1, wherein the gate current supplying means is arranged to supply no current to the gate for a period of time between the first voltage waveform and the second voltage waveform, and wherein the first and second voltage waveforms are different.

3. A control circuit according to claim 1, wherein the second voltage waveform is continuous with the first voltage waveform.

4. A control circuit according to claim 1, wherein:
at a first brightness level based on a first setting of the variable input device, the gate current supplying means is arranged to supply no current to the gate for a period of time between the first voltage waveform and the second voltage waveform; and
at a second brightness level based on a second setting of the variable input device, the second brightness level lower than the first brightness level, the second voltage waveform is continuous with the first voltage waveform.

5. A control circuit according to claim 1, wherein at least one of the first and second voltage waveforms is a constant voltage waveform.

6. A control circuit according to claim 1, wherein at least one of the first and second voltage waveforms is a sequence of pulses of the same magnitude.

7. A control circuit according to claim 1, wherein the second voltage waveform has a magnitude, an absolute magnitude or an average magnitude that is different from a corresponding value of the first voltage waveform.

8. A control circuit according to claim 7, wherein the second voltage waveform magnitude, absolute magnitude or average magnitude is lower than the corresponding value of the first voltage waveform.

9. A control circuit according to claim 1, wherein the power consumed by the second voltage waveform is less than the power consumed by the first voltage waveform.

10. A control circuit according to claim 1, wherein the gate current supplying means is arranged to supply, within a second half-cycle of an alternating voltage applied to the first terminal, a third voltage waveform at the gate of the thyristor-type device to supply a gate current to place the thyristor-type device in a conducting state, followed by a fourth voltage waveform to supply a gate current to maintain the thyristor-type device in a conducting state.

11. A control circuit according to claim 10, wherein the first and third voltage waveforms and the second and fourth voltage waveforms are the same.

12. A control circuit according to claim 10, wherein the first and third voltage waveforms and the second and fourth voltage waveforms are different.

13. A control circuit according to claim 1, wherein the gate current supplying means comprises a microcontroller powered by the low-voltage power supply.

14. A control circuit according to claim 1, wherein the thyristor-type device is a triac.

15. A control circuit according to claim 1, further comprising an additional connection to the alternating voltage source for supplying power to a low-voltage power supply of the control circuit even when the thyristor-type device is conducting.

16. A system comprising the control circuit according to claim 1, electrically connected to the load at the second terminal, wherein the load is a fast-reacting or capacitive load.

17. A system according to claim 16, wherein the load is an LED light source.

18. A system according to claim 16, wherein the control circuit is a dimmer switch circuit.

19. A method for controlling current through a load, the method comprising:
applying an alternating voltage to a first terminal of a thyristor-type device;
controlling conductivity of the thyristor-type device by supplying current to a gate of the thyristor-type device, wherein supplying current to the gate of the thyristor-type device comprises:
within a half-cycle of the alternating voltage being applied to the first terminal, applying a first voltage waveform at the gate of the thyristor-type device to place the thyristor-type device in a conducting state followed by applying a second voltage waveform to maintain the thyristor-type device in a conducting state; and
supplying an output from a second terminal of the thyristor-type device to the load.

* * * * *